United States Patent Office 3,674,500
Patented July 4, 1972

3,674,500
PROCESS OF PRODUCING A MEAT-LIKE TEXTURIZED FOOD PRODUCT
Taro Nagasawa, Mamoru Tomita, and Tomokazu Obayashi, Tokyo, Yoshitaka Tamura, Yokohama, and Yoko Kenmotsu, Odawara, Japan, assignors to Morinaga Milk Industry Co. Ltd.
Filed May 12, 1969, Ser. No. 823,783
Claims priority, application Japan, Dec. 23, 1968, 43/93,762
Int. Cl. A23j *1/14, 3/00*
U.S. Cl. 99—17       24 Claims

ABSTRACT OF THE DISCLOSURE

A foodstuff material having a meat-like texture is prepared by mixing a protein solution with a solution containing free divalent cations in the concentration of more than 0.06 mole so that the ratio is more than 0.25 millimole of the free divalent cations per 1 g. of the protein, reacting them in a highly alkaline region of pH 9 or higher at a temperature of above 40° C. to produce a coagulated protein and, after neutralizing the excess of alkali, filtering the coagulated protein, and washing with water and dehydrating it.

CROSS-REFERENCE TO RELATED APPLICATION

Priority of corresponding Japanese application No. 93,762, filed Dec. 23, 1968 is claimed under the Convention.

BACKGROUND OF THE INVENTION

Field of the invention

The present invention relates to a process for preparing a food stuff material having a porous and elastic meat-like texture by reacting a protein solution with a divalent cation in a highly alkaline region (pH 9.0 or above) and thereafter neutralizing, washing with water and removing the reaction product.

Description of the prior art

Casein, soy bean protein, and the like have been utilized in various foodstuffs as a filler or a binder because of good balance of the amino acids therein and their high nutritive value. But, not as the primary foodstuff, and, accordingly, the amount of protein used has been limited.

SUMMARY OF THE INVENTION

The inventors recognized that:

The combining of calcium ions with casein protein is decreased when the pH is in the region of 6.0 to 8.0, but when the pH is in excess of 9.0, the result is reversed;

On rapidly reacting a divalent cation with a protein when the pH is 9.0 or higher, a protein coagulate having a meat-like texture is obtained, and this coagulate contains 10 to 60 mg. of the amount of combination per 1 g. of protein, such a larger amount of 10–60 mg., and is different in composition and texture from the protein coagulate known to the prior art;

The protein coagulate precipitated under such conditions is porous and elastic, has a meat-like texture and is highly suitable as an edible protein;

The required conditions for producing such protein coagulate include, in addition to the pH range of reaction solution as specified above, the concentration of divalent cation, the ratio of divalent cation to protein, and the reacting temperature, and the protein coagulate is obtained by selecting the appropriate combination of these values described above;

The protein which is available as the major raw material includes casein, soy bean protein, wheat gluten, and the like;

These proteins can be combined with fat and carbohydrate to form a protein coagulate as above described;

It is possible to produce various meat-like textured materials by using as the raw material casein, soy bean protein, or a mixture of the two or a mixture of protein, fat and carbohydrate; and The product obtained according to the process of the present invention is high in nutritive value, excellent in retention of fat and water, its nutritive substance is not damaged in the reaction procedure, and it corresponds closely to animal meat in taste, texture, aroma and the like.

DESCRIPTION OF THE PREFERRED EMBODIMENTS

Figure 1:
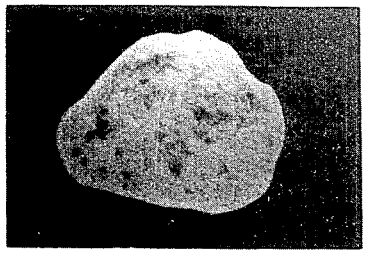
FIGS. 1 and 2 are photographs showing the coagulated products of reacting solutions differing in pH.

The process of the present invention is carried out with the steps of:

(1) preparation of a protein solution;
(2) preparation of a reaction liquid;
(3) reaction;
(4) neutralization; and
(5) washing with water.

(1) Preparation of the protein solution

Casein, soy bean protein, wheat gluten or a mixture thereof or protein-fat mixtures and protein-fat-carbohydrate mixtures may be employed as the raw material.

If a casein is used as a raw material, it is first dissolved by using an alkaline solution as in the conventional manner. The concentration of casein may be over 2%, and, preferably, is in the range of 8 to 12%. If the concentration of casein in the solution is too low, the texture of the resulting protein coagulate becomes too fine and short, and if the concentration is too high the texture becomes too coarse and lumpy. The alkaline agents which can be used in the present invention include sodium hydroxide, potassium hydroxide, potassium phosphate, sodium phosphate, sodium hydrogen phosphate, potassium hydrogen phosphate, potassium carbonate, sodium carbonate, etc. and in particular, an alkaline having a phosphate radical is preferable. The presence of the phosphate radical serves to form a calcium caseinate phosphatide complex and improves the texture of the coagulate.

When sodium hydroxide, potassium hydroxide, etc. is used, the coagulated product tends to become too fine and short, and the texture too soft.

When employing soy bean protein powder as a protein source, it is preferably dispersed in hot water and dissolved by using an alkaline agent to prepare a solution containing more than 2%, preferably 5 to 8%, of protein. If necessary, the amount of phosphate salts containing a phosphate radical may be increased. As described above, when the salts contain the phosphate radical, the resulting coagulate has a better body and texture.

Alternatively, next to protein, carbohydrates make up the largest part of the soy bean protein powder and, in the course of the reaction, most of these carbohydrates are absorbed by the protein so that the loss of carbohydrate is surprisingly low.

When the raw material consists of a mixed solution of casein and soy bean protein, the texture of the protein coagulate produced by the reaction treatment may be prepared taking into consideration the amino acid constitution thereof and the balance of nutrition depending upon the purpose of use.

If the raw material consists of a mixed solution of protein and fat, it is preferable to use an appropriate emulsifier for emulsifying the fat more completely to disperse it homogeneously and to cover the fat globules with the protein. In case of adding the fat to the protein solution, the fat is melted, added to the protein solution, and homogenized by means of a homogenizer at a temperature of above 40° C., preferably 60 to 80° C. and under a pressure of 40 to 200 kg./cm.$^2$. The ratio of fat to protein is preferably 0 to 6 of fat per 1 of protein by weight with the range for obtaining an appropriate meat-like texture being 0 to 1.5.

As the ratio of protein to fat is increased, the texture of protein coagulate which is the reaction product tends to become thick and short and soft and tends to increase the loss of fat and protein.

In a solution of mixed carbohydrate and protein and fat, as the carbohydrate, starch, cane sugar, lactose, etc. are available, and, in the present invention, starch is preferred as the carbohydrate to be mixed, for the reason that in a high alkaline region monosaccharide and disaccharide may be easily decomposed and lost. A polysaccharide having a high molecular weight such as the carbohydrate contained in the above-mentioned soy bean protein powder is not decomposed and is mixed homogeneously with fat and protein to form a homogeneous texturized material. However, any case the loss of carbohydrate is large in comparison with the yields of fat and protein and therefore the amount of carbohydrate to be added is preferably 0 to 1.0 per 1.0 of protein, by weight, with the most effective ratio being in the range of 0 to 0.25 per 1.0 of protein. Therefore, a protein coagulate having a nutritive proportion corresponding to the desired object can be obtained by combining protein, fat and carbohydrate in any ratio.

As in the relationship of protein with fat, it has been found that the texture of the protein coagulate after reaction tends to be thin and short and becomes too brittle as the ratio of carbohydrate to protein is increased and therefore the loss of carbohydrate becomes too large. In case of protein and carbon hydrate, the take-in of carbohydrate for the protein coagulate is less than that of fat, in comparison with the case of protein and fat, and therefore the loss becomes too large.

In addition, if wheat gluten used as a protein source the similar reaction coagulated material is produced. However, using a gluten alone is not economically advisable and the texture of the resulting protein coagulate is brittle, and so it is preferable to use the gluten mixed with casein or soy bean protein in an appropriate ratio.

(2) Preparation of the reaction liquid

In order to react a divalent cation with a protein, which exists in the free state in a high alkaline region (pH above 9.0), and, therefore, in order to maintain the pH constant during the course of reaction, calcium hydroxide, magnesium hydroxide, etc., may be used, with calcium hydroxide being preferable. Also, other divalent cations to be used will include, in addition to calcium and magnesium ferric ion, cupric ion, zinc ion, etc., however, divalent cations other than calcium are considered to be available for pharmaceutical usage, animal experiment, and other special applications, and, in consideration of daily foodstuff requirements, the calcium ion is preferable.

For the preparation of reaction liquid, for example, it is ncessary to form a super-saturated solution of calcium hydroxide, add hydrochloric acid or calcium chloride thereto to make the pH above 9.0, preferably 11.0 to 12.0, control the concentration of free calcium ions to above 0.25 millimole per 1 g. of protein, particularly in the range of 0.6 to 3.75 millimole per 1 g. of protein, and maintain the temperature of liquid above 40° C., particularly 85 to 95° C. The ratio of calcium ion to protein is as described above, however, if the concentration of calcium ion used in the reaction is too dilute, the desired coagulate texture can not be obtained. The concentration of cation to be used is preferably above 0.06 mole with the range of 0.25 to 0.5 mole being particularly desirable. If the reaction liquid is below 9.0 in pH the desired product cannot be obtained as shown in FIG. 1.

Figure 2:
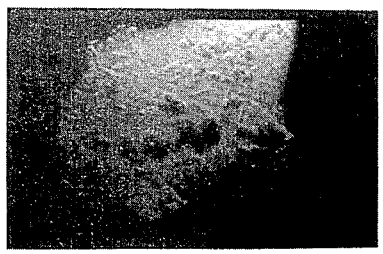

FIGS. 1 and 2 show the effect of difference in pH on the formation of coagulate in the time of reaction.

FIG. 1 shows the state of coagulated product manufactured under the following conditions:

| | |
|---|---|
| pH of the reaction liquid | 8.5 |
| Reaction temperature ° C. | 90 |
| Calcium ion concentration mole | 0.25 |
| Ratio of calcium ion to protein millimoles/g. | 2.5 |

FIG. 2 shows the state of coagulated product manufactured under the following conditions:

| | |
|---|---|
| pH of the reaction liquid | 9.0 |
| Reaction temperature ° C. | 90 |
| Calcium ion concentration mole | 0.25 |
| Ratio of calcium ion to protein millimoles/g. | 2.5 |

Figure 3:
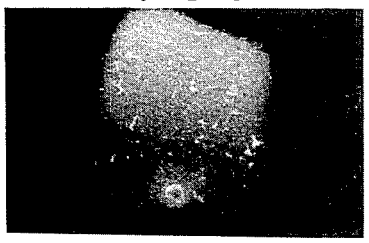
FIGS. 3 and 4 are photographs showing the coagulated products of reacting solutions differing in calcium ion concentration.

If the concentration of calcium ions used in the reaction is not above 0.25 millimole per 1 g. of protein, the desired protein coagulate can not be obtained as in FIG. 3.

Figure 4:
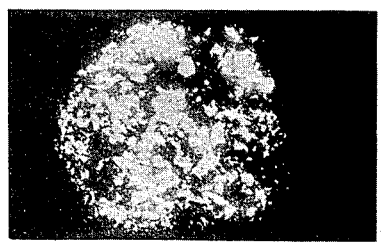

Next, the effect of calcium salt concentration on the coagulated product is shown in FIGS. 3 and 4.

FIG. 3 shows the state of coagulated product manufactured under the following conditions:

| | |
|---|---|
| Concentration of calcium ions mole | 0.06 |
| Ratio of calcium ions to protein millimoles/g. | 0.2 |
| pH of the reaction liquid | 11.60 |
| Reaction temperature ° C. | 90 |

FIG. 4 shows the state of coagulated product manufactured under the following conditions:

| | |
|---|---|
| Calcium ion concentration of reaction liquid mole | 0.06 |
| Ratio of calcium ions to protein millimoles/g. | 0.25 |
| pH of the reaction liquid | 11.60 |
| Reaction temperature ° C. | 90 |

Thus, if the calcium ion concentration of the reaction liquid is not proper, a coagulate having the meat-like texture can not be obtained. In Netherlands Milk and Dairy Journal 17, 313 (1967), it is described that an alkaline modified casein is reacted with calcium hydroxide at pH 12 in the presence of carbohydrate, and that, because of the low concentration of calcium ions and low reaction temperature, a protein coagulate is not produced and a precipitate is not formed unless fructose is added. The precipitate so obtained does not have a meat-like texture structure as does the coagulate product of the present invention.

(3) The reaction step

The protein solution described in (1) and the reaction liquid described in (2) were heated to a temperature of above 40° C., more exactly, to 85 to 90° C., separately, and were reacted.

The reaction temperature is an indispensable requirement for producing a coagulated precipitate of meat-like texture, and at a temperature of below 40° C., even if other conditions are fulfilled, satisfactory results can not be obtained.

Figure 5:
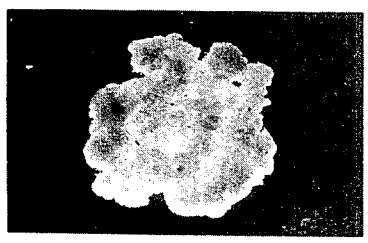
FIGS. 5 and 6 are photographs showing the coagulated products of reacting solutions differing in temperature.
Figure 6:
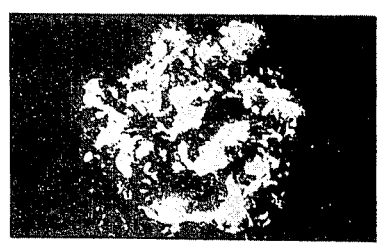

The effect of reaction temperature on the coagulated product is shown in FIGS. 5 and 6.

FIG. 5 shows the state of coagulated product manufactured under the following conditions:

pH of the reaction liquid _____ 11.6
Calcium ion concentration _____ mole __ 0.25
Ratio of calcium ions to protein __ millimoles/g __ 2.5
Reaction temperature _____ °C __ 28

FIG. 6 shows the state of coagulated product manufactured under the following conditions:

pH of the reaction liquid _____ 11.6
Calcium ion concentration _____ mole __ 0.25
Ratio of calcium ions to protein ____ millimole/g __ 2.5
Reaction temperature _____ °C __ 40

Figure 7:
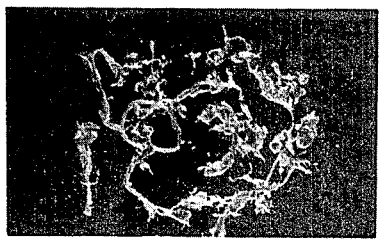
FIG. 7 shows an example of a coagulated product prepared according to the process of this invention.

The scope within which the present invention is practicable is defined by various conditions as described above, and, if all of these conditions are met, as shown in FIG. 7, a meat-like texture which is superior to prior art products as a foodstuff can be obtained.

FIG. 7 shows the state of coagulated product manufactured under the following conditions:

Calcium in concentration _____ mole __ 0.25
Ratio of calcium ions to protein _____ moles/g __ 2.5
pH of the reaction liquid _____ 11.6
Reaction temperature _____ °C __ 90

And also the properties of the meat-like texture so obtained vary depending upon the way of carrying out the reaction operation.

(a) The reaction liquid may be slowly added to the protein solution while stirring the solution vigorously, and.

Also the reaction liquid must be stirred before adding the alkaline agent, i.e. calcium hydroxide, homogeneously.

(b) The protein solution may be slowly added to the reaction liquid while stirring the liquid vigorously. The protein coagulates produced differ from one another depending upon which of the above two methods is used. The texture of the coagulate produced by method (a) is similar to that of animal meat which has been boiled and ground, whereas the tissue of the coagulate produced by method (b) is fibrous and is similar to corned beef.

The method to be employed depends upon the type of the reaction product used. However, with method (b), if soy bean protein or wheat gluten is employed alone, or if the ratio of fat and carbohydrate mixed is increased, the texture produced is quite close to that produced by method (a). Furthermore, it is possible to control the type of the texture by selecting the method of adding the solution and by varying the kind and degree of stirring.

But in any event a porous and elastic meat-like texture can be obtained.

Therefore, texturized materials having various shapes, sheet, fiber, lump, sphere, etc. can be manufactured by varying the way of handling the solution, for example, extruding the solution through a slit or porous plate, in the reaction step. After the reaction is complete, the pH of the solution is preferably above 9.0; if it is less than 9.0, the yield tends to be lower. In order to obtain a good yield, after the reaction is complete, the pH of the solution is preferably 11.0 to 12.0, and it is advantageous to add enough alkaline agent to maintain the solution at a pH of 9.0 or more after the reaction is completed.

(4) Neutralization step

After the reaction (3), the excess of alkaline agent, which is usually calcium hydroxide in the present invention, added to maintain the high pH value in the reaction step, is neutralized with an acid and then is removed in the subsequent water-washing step. Thereby, any strong alkaline taste due to the existence of an excess of alkaline agent is completely removed. It is not necessary to remove the excess alkaline agent as a water soluble calcium salt; an acid, such as lactic acid, citric acid, tartaric acid, etc. may be employed to remove the excess alkaline agent as a slightly soluble divalent salt, calcium salt. However, it is most economical to neutralize the reaction liquid to pH 6.0 to 7.0 with hydrochloric acid after the reaction is completed. Neutralizing with hydrochloric acid, etc. may be carried out immediately, or after washing with water one or several times, after the reaction is completed and the reaction liquid is cooled to room temperature. The protein coagulate of the present invention is porous, and, therefore, in order to neutralize the alkaline agent absorbed therein, it is necessary to stir slowly for 30 to 60 minutes after adding an acid.

(5) Water washing step

After completing the neutralization step in (4), the protein coagulate is filtered and pressed to reduce the water content to 40 to 70%, and, thereafter, the protein coagulate is dispersed in water again, and the steps of filtering, pressing and dispersion are repeated. In repeating the steps, the pH of the liquid phase is measured and, if the neutralization is insufficient, it is adjusted by adding an acid. The water washing step is repeated until the neutral salts contained in the protein coagulate are washed out and the coagulate becomes completely tasteless. After completion of the water washing step, the protein coagulate is adjusted to the water content of from 40 to 80% or dried according to end use.

The advantages obtained by the process of the present invention as described above are noted below:

(1) The bad odor peculiar to casein and soy bean protein is almost completely removed.

Heretofore, casein and soy bean protein have been considered as additives to various foodstuffs in view of their higher nutritive value; however, the amount of these proteins to be used and the scope of their utilization have been hitherto limited by the undesirable odor peculiar to these proteins.

However, in the protein coagulate obtained by the process of the present invention, the number of application, the way of using and the amount of protein coagulate to be used as a foodstuff have been remarkably enlarged and the usefulness of casein and soy bean protein has been elevated.

(2) A pure white casein coagulate and light yellow soy bean protein coagulate can be obtained.

The casein coagulate obtained according to the process of the present invention is pure white and the soy bean protein coagulate is light yellow, and therefore, these coagulates can be controlled to any desired color shade and are very effective when they are utilized in various foodstuffs.

(3) The protein coagulate is tasteless.

The protein coagulate obtained according to the process of the present invention is not only odorless and pure white or light yellow but is also quite tasteless, so that it has a great advantage in that it can be seasoned by any flavor easily.

The above mentioned three effects are indispensable elements in case of utilizing the protein coagulate as a foodstuff.

(4) The protein coagulate obtained according to the process of the present invention is porous and elastic.

The protein coagulate obtained according to the process of the present invention has remarkable feature of having a good porosity and elasticity. The water content of the protein coagulate can be reduced from 80% to 40% by pressing it and as the water content is reduced a highly elastic mass is formed. This feature is a novel physical property of protein, one not obtained in the conventional casein and soy bean protein, and is indispensable for proper consistency and cohesion in eating a foodstuff.

(5) The structure of the protein coagulate obtained according to the process of the present invention bears a close resemblance to the texture of animal meat.

The protein coagulate obtained according to the process of the present invention has good porosity and elasticity as described in about (4) as well as a texture and body like corned beef like or resembles meat which has been ground, and boiled. When the coagulate is utilized as a raw material for hamburg steaks, sausages, hams, preserved meat-foods relish, etc., such texture is important, and the texture as well as its eat feeling such as crisp and tooth feeling bears a close resemblance to that of animal meat.

(6) The protein coagulate obtained according to the process of the present invention is excellent in retention of fat and water.

The protein coagulate obtained according to the process of the present invention, in addition to being porous and elastic as well as having a meat-like texture, is excellent in retention of fat and water and has excellent properties as a raw material for ham and sausage, or as an additive for foodstuff, necessary to form an emulsion of other fats and water and retain the fat and water therein. As shown in examples, even when the protein coagulate obtained in the present invention is added to a sausage which is then boiled and sterilized, according to the conventional manner, separation of water or fat therefrom has not been observed. And also, in case of mixing fat homogeneously therein and reacting it therewith, the protein coagulate exhibits a specific property of not separating the fat therefrom even on boiling or frying it in a ring pan.

(7) The protein coagulate having a high nutritive value can be produced.

Other than one part of the cystin, the amino acid composition before and after the reaction in the process of the present invention scarcely changes and, even if a fat is mixed into a protein solution homogeneously and the mixture is reacted, the fatty acid composition before and after this reaction scarcely changes; and, although qualitative analysis by means of the thin layer chromatography shows slight increase in free fatty acid in the fat after the reaction, animal experiments shown no difference in nutritive effect. The nutritive value of the protein and fat is considered to be damaged little or not at all during the reaction of the present invention. Furthermore, in the present invention casein which is an animal protein and soy bean protein which is a vegetable protein can be mixed in any proportion and reacted, and a protein coagulate having higher nutritive effect can be produced as a homogeneous texture by combining an animal protein and a vegetable protein, and the combination will have both animal and vegetable characteristics. Also, according to the present invention, of fat and protein mixed texture and a protein, fat and carbohydrate mixed texture can be manufactured by mixing protein with fat and/or carbohydrate homogeneously and reacting them. It is very important, from the viewpoint of nutrition and character of foodstuffs, that the protein coagulate have a meat-like texture and that it be possible to mix nutritive elements in any desired proportion.

(8) The dried protein coagulate can be reconstituted its original texture and softness by adding hot water thereto.

It has been found that the protein coaglate obtained by the present invention can be hardened like dried beef by drying but can easily be restored to its original structure and softness by immersing it in hot water. This shows that the protein coagulate of the present invention is absorbent and that it presents a large contact area to hot water and therefore hot water easily permeates the texture. This specific property is an important factor with respect to dried foodstuffs.

(9) The yield is high and the loss is low.

The protein coagulate obtained by the process of the present invention was filtered and filtrate was separated. The quantity of protein before reaction, the quantity of protein coagulate after reaction and the quantity of protein in the filtrate were determined.

EXAMPLE 1 (ANALYTICAL VALUES)

Before reaction—1.00 kg.—100%
In the protein coagulate—0.969 kg.—96.9%
In the filtrate—0.026 kg.—2.6%

When incorporating fat homogeneously in a protein solution, the yields of protein and fat are as follows:

EXAMPLE 2

|  | Protein | | Fat | |
| --- | --- | --- | --- | --- |
|  | Kg. | Percent | Kg. | Percent |
| Before reaction | 1.00 | 100 | 0.542 | 100 |
| In the protein coagulate | 0.982 | 98.2 | 0.510 | 97.2 |
| In the filtrate | 0.012 | 1.2 | 0.011 | 2.1 |

When incorporating fat and carbohydrate homogeneously in a protein solution the yields of protein, fat and carbohydrate are as follows:

EXAMPLE 3

|  | Protein | | Fat | | Carbohydrite | |
| --- | --- | --- | --- | --- | --- | --- |
|  | Kg. | Percent | Kg. | Percent | Kg. | Percent |
| Before reaction | 1.00 | 100 | 0.525 | 100 | 0.20 | 100 |
| In the protein coagulate | 0.975 | 97.5 | 0.512 | 97.5 | 0.177 | 88.5 |
| In the filtrate | 0.019 | 1.9 | 0.012 | 2.3 | 0.022 | 11.0 |

As shown in the above results the yields of protein and fat are above 96%. The high yield in the process of the present invention is of great economic advantage when carrying out the present invention on an industrial scale.

(10) The reactions in the process of the present invention are simple, no special equipment is required, operating costs are low, and, also, the process of the present invention is practicable for either large scale continuous production or small scale batch production of protein coagulate.

Lastly, the novel protein coagulate obtained by the process of the present invention is excellent as a foodstuff and can be used in a wide variety of food products in daily dishes, such as ham, corned beef, sausages or hamburg steak, meat balls, Chinese steamed meat-in-blanket dishes, croquettes, meat dumplings, etc., breads, cakes, preserved meat-food relish, or as a nutritions additive for rice.

EXAMPLE 1

1.19 kg. of lactocasein consisting of 2.5% fat, 84.0% protein, 1.5% ash and 12.0% water was dispersed in about 8 kg. of hot water at 40 to 50° C., and 0.715 kg. 10% by weight of $K_3PO_4$ solution was added thereto, and, after adjusting the amount of liquid to 10 kg., was heated under stirring to completely dissolve the casein and then was heated up to 90° C.

The pH of the casein solution was 6.4 and the protein concentration 10%, by weight. Next, 0.285 kg. of calcium hydroxide was dispersed in about 3 kg. of water, and 1.660 kg. of 3 N hydrochloric acid was added thereto, and, after adjusting the amount of liquid to 10 kg., was heated to 85° C. under stirring to make a reaction liquid.

The pH of the reaction liquid was 11.6 and it contained about 2.5 millimole of free calcium ions per 1 g. of protein. The lactocasein solution was gradually added over about 10 minutes to the reaction liquid under vigorously stirring, and, after the addition was finished, stirring was continued for about 10 minutes. After completion of the reaction, the pH was maintained at 11.6. After the above reaction was completed, 400 g. of 3 N hydrochloric acid was added thereto, and, after stirring for about 30 minutes, the pH was adjusted to 6.8 by further adding 3 N hydrochloric acid.

After neutralization was completed, the protein coagulate was filtered by a filter cloth and was washed with water until the reaction product was tasteless.

The protein coagulate obtained by the above procedure had a meat-like texture similar to that of corned beef.

The amounts, composition and yield of product were as follows:

| | | |
|---|---|---|
| Fat | percent | 0.42 |
| Protein | do | 26.90 |
| Ash | do | 3.48 |
| Water content | do | 70.10 |
| Product | kg | 3.60 |
| Yield | percent | 96.9 |

EXAMPLE 2

1.19 kg. of lactocasein (same as in Example 1) was dispersed in about 8 kg. of hot water at 40 to 50° C., and 0.715 kg. of 10%, by weight, solution of $K_3PO_4$ was added thereto, and, after adjusting the amounts of liquid to 10 kg., was heated under stirring to completely dissolve the casein and then was heated up to 75° C. Next, 0.5 kg. of adjusted lard was heated to 75° C., and after it had melted, was stirred to dissolve, and then was added to the above casein solution, and, after mixing, was homogenized at 75° C., 150 kg./cm.$^2$ by means of a homogenizer, and, thereafter, was heated to 85° C. The pH of the resulting emulsion was 6.40 and it was 4.75% fat and 9.5% protein; the amount of liquid was about 10.5 kg. Next, 100 g. of calcium hydroxide and 370 g. calcium chloride ($CaCl_2 \cdot 2H_2O$) were dispersed in about 4 kg. of water, and, after adjusting the amount of liquid to 10 kg., were heated to 85° C. to form a reaction liquid. The pH of the reaction liquid was 11.6 and it contained about 2.5 millimole of free calcium ions per 1 g. of protein.

Then, the emulsion was gradually, over about 10 minutes, added to the reaction liquid under vigorous stirring, and, after the addition was finished, stirring was continued for about 10 minutes. After the reaction was completed, the pH was maintained at 11.6. After the reaction was completed, 400 g. of 3 N hydrochloric acid was added thereto, and then, after stirring for 30 minutes, the pH was adjusted to 6.8 by adding 3 N hydrochloric acid. After the neutralization was completed, the protein coagulate produced was filtered by a filter cloth and was washed with water until the protein coagulate was tasteless.

After the washing was completed, the coagulate was pressed to reduce the water content of about 65%.

The protein coagulate obtained by the above procedure, as in Example 1, had a meat-like texture similar to that of corned beef. The amount, composition and yield of the product were as follows:

| | | |
|---|---|---|
| Fat | percent | 10.02 |
| Protein | do | 20.05 |
| Ash | do | 3.20 |
| Water content | do | 66.73 |
| Product | kg | 4.90 |
| Yield | percent | 98.5 |

EXAMPLE 3

The casein solution and reaction liquid were prepared in the same manner as in Example 1. The reaction liquid was gradually, over about 10 minutes, added to the casein solution under vigorous stirring. After the addition was completed, stirring was continued for 10 minutes to complete the reaction. When the reaction was completed, the pH was 11.6. As in Example 1, after adjusting the pH to 6.80 with 3 N hydrochloric acid, the product was washed with water and pressed to reduce the water content to about 70%.

The consistency and structure of the protein coagulate resembled that of ground and boiled animal meat. The amounts, yield, and composition of the product were as follows:

| | | |
|---|---|---|
| Fat | percent | 0.41 |
| Protein | do | 26.88 |
| Ash | do | 3.49 |
| Water | do | 70.22 |
| Product | kg | 3.57 |
| Yield | percent | 96.0 |

EXAMPLE 4

In the same manner as in Example 2, the emulsion containing casein and fat and the reaction liquid were prepared. The reaction liquid was gradually, over about 10 minutes, added to the emulsion under vigorous stirring. After the addition was completed, stirring was continued, and thereafter, as in Example 2, after adjusting the pH to 6.80 with 3 N hydrochloric acid, the product was washed with water and pressed to reduce the water content to about 65%.

The consistency and texture of the protein coagulate produced resembled that of ground and boiled animal meat as in Example 3. The amounts, yield, and composition of the product were as follows:

| | | |
|---|---|---|
| Fat | percent | 10.03 |
| Protein | do | 20.04 |
| Ash | do | 3.17 |
| Water | do | 66.76 |
| Product | kg | 4.86 |
| Yield | percent | 97.8 |

EXAMPLE 5

The emulsion of lactocasein and fat was prepared in the same manner as in Example 2. 0.2 kg. of corn starch was dissolved in 10.5 kg. of the emulsion, the ratio of protein to fat to carbohydrate was 1:0.5:0.2. Next, the reaction liquid was prepared in the same manner as in Example 2 and was treated under the same conditions as in Example 2.

After the reaction was completed, the pH was adjusted to 6.80 with 3 N hydrochloric acid and was neutralized. The protein coagulate produced was filtered, washed with water, and pressed to reduce the water content to about 65%.

In consistency and texture, the protein coagulate so obtained resembled corned beef, and the composition, amount and yield of the product were as follows:

| | | |
|---|---|---|
| Fat | percent | 9.60 |
| Protein | do | 19.40 |
| Carbohydrate | do | 3.45 |
| Ash | do | 3.15 |
| Water | do | 64.40 |
| Product | kg | 5.03 |
| Yield | percent | 94.6 |

EXAMPLE 6

200 g. of commercially available soy bean protein powder having the following composition was dispersed in hot water, and, after adjusting the pH to 10.5 with 10% (by weight) $K_3PO_4$ solution, was heated to dissolve and the amount of liquid was adjusted to 2.0 kg.

The composition of commercially available soy bean powder:

| | Percent |
|---|---|
| Fat | 0.4 |
| Protein | 64.0 |
| Ash | 6.0 |
| Carbohydrate | 25.6 |
| Water | 4.0 |

Next, a casein solution was prepared in the same manner as in claim 1, and 8 kg. of it was mixed with the above soy bean protein solution, and the temperature was adjusted to 60° C. Alternatively, the reaction liquid was prepared as in Example 1, and was treated by the same procedure and method as in Example 1 to obtain a protein coagulate.

The texture was a meat-like texture much like corned beef. The composition, amount and yield were as follows:

| | | |
|---|---|---|
| Fat | percent | 0.34 |
| Protein | do | 25.80 |
| Carbohydrate | do | 1.15 |
| Ash | do | 3.21 |
| Water | do | 69.50 |
| Product | kg | 3.50 |
| Yield | percent | 94.2 |

EXAMPLE 7

1.19 kg. of lactocasein (the same as in Example 1) was dispersed in 8 kg. of hot water at 40 to 50° C., and 0.23 kg. of 10% (by weight) NaOH solution was added thereto, and, after adjusting the amount of liquid to 10 kg., was heated under stirring to dissolve the casein completely, and further heated to 90° C. The pH of the casein solution was 6.35 and the protein concentration was 10%, by weight. Next, in the same manner as in Example 1, the reaction solution was prepared, and was treated to obtain a protein coagulate.

The protein coagulate had a meat-like texture closely resembling that of boiled ground meat.

The amount, composition, and yield of the product are as follows:

| | | |
|---|---|---|
| Fat | percent | 0.41 |
| Protein | do | 26.75 |
| Ash | do | 3.06 |
| Water | do | 69.78 |
| Product | kg | 3.57 |
| Yield | do | 95.5 |

EXAMPLE 8

3.2 kg. of young horse-flesh, 3.4 kg. of veal, and 3.8 kg. of pork were cured at 4–5° C. for 3 days in the conventional manner. Then 25% table salt was added to the protein coagulate prepared in Example 1 and was stored in cold for 1 day. After curing was finished, the meats, 4.02 kg. of protein coagulate, and 3.58 kg. of lard were chopped by a conventional chopper and, while adding ice in limited amounts to a silent cutter, the chopper protein coagulate, young horse-flesh, veal, pork, coloring matter, spices, condiments, preservatives (phosphates), etc. were added thereto and lastly lard was added thereto. This step was carried out at 4–6° C. and was completed in 9 minutes. The amount of ice used was 3.60 kg., about 20% of the total amount.

After the silent cutter treatment was completed, the product was put in a casing, was heated and was smoked to make a sausage. In the sausage so obtained the separation of fat and water was not observed, and its elasticity, firmness, and flavor were good. Accordingly, the protein coagulate of the present invention exhibited very good results as a filler or binder.

We claim:

1. A process for preparing a foodstuff material having a meat-like texture which comprises
the step of preparing a mix of a protein solution with a reaction solution containing free divalent cations in the concentration of more than 0.06 mole so that the ratio is more than 0.25 millimole of the free divalent cation per 1 g. of the protein;
reacting said mix in a highly alkaline region of pH 9 or higher at a temperature of above 40° C. to produce a coagulated protein;
neutralizing the excess of alkali;
filtering the coagulated protein, and washing with water.

2. A process for preparing a foodstuff material as set forth in claim 1, wherein the protein solution is a casein solution containing above 2% of casein.

3. A process for preparing a foodstuff material as set forth in claim 1, wherein the protein solution is a soybean protein solution containing about 2% of protein.

4. A process for preparing a foodstuff material as set forth in claim 1, wherein the protein solution is a mixture solution of casein and soybean casein solutions.

5. A process for preparing a foodstuff material as set forth in claim 1, wherein the protein to be used as a raw material is casein, soybean protein or wheat gluten, or their mixture.

6. A process for preparing a foodstuff material as set forth in claim 1, wherein the protein to be used as a protein source may contain fat and carbohydrate.

7. A process for preparing a foodstuff material as in claim 6, further comprising the steps of:
emulsifying the fat to disperse it homogeneously and to cover the fat globules with the protein;
melting the fat;
adding it to the protein solution at the ratio to protein between 1 to 6 of fat per 1 of protein by weight; and
homogenizing it at a temperature of above 40° C., preferably 60 to 80° C. and under a pressure of 40 to 200 kg./cm.$^2$.

8. A process for preparing a foodstuff material as set forth in claim 1, wherein the divalent cation to be used is calcium ion.

9. A process for preparing a foodstuff material as claimed in claim 1, said mix comprising a combination of protein, fat and carbohydrates.

10. A process for preparing a foodstuff material as claimed in claim 1, said protein solution including at least between 2 to 12% of materials, selected from a group consisting of casein, soybean, wheat gluten, fats and carbohydrates.

11. A process for preparing a foodstuff material as claimed in claim 1, said divalent cation selected from the group consisting of calcium hydroxide, magnesium hydroxide, calcium ion, magnesium ion, ferric ion, cupric ion and zinc ion.

12. A process for preparing a foodstuff material as claimed in claim 1, said step of reacting comprising the use of alkaline agents selected from a group consisting of sodium hydroxide, potassium hydroxide, potassium phosphate, sodium phosphate, sodium hydrogen phosphate, potassium hydrogen phosphate, potassium carbonate and sodium carbonate.

13. A process for preparing a foodstuff material as claimed in claim 1, said step of reacting comprising the use of an alkaline having a phosphate radical whereby the presence of the phosphate radical serves to form a calcium caseinate phophatide complex and improves the texture of the coagulate.

14. A process for preparing a foodstuff material as claimed in claim 1, the preparation of said reaction solution comprising:
the preparation of a super-saturated solution of calcium hydroxide, with said divalent cations added thereto to make the pH above 9.0, preferably 11.0 to 12.0, controlling the concentration of free calcium ions to above 0.25 millimole per 1 g. of protein, particularly in the range of 0.6 to 3.75 millimole per 1 g. of protein, and maintaining the temperature of the liquid above 40° C., particularly 85 to 95° C.

15. A process for preparing a foodstuff material having a meat-like texture, as claimed in claim 1, comprising:

the step of preparing said protein solution at a ratio of about 1.19 kg. of lactocasein consisting of 2.5% fat, 84.0% protein, 1.5% ash and 12.0% water dispersed in about 8 kg. of hot water at 40 to 50° C.; with about 0.715 kg. 10% by weight of $K_3PO_4$ solution added thereto; and, after adjusting the amount of liquid to 10 kg.; heating it under stirring to completely dissolve the casein and thereafter up to 90° C., whereby the pH of the casein solution is 6.4 and the protein concentration 10%, by weight;

the step of preparing the reaction liquid at a ratio of about 0.285 kg. of calcium hydroxide dispersed in about 3 kg. of water, and 1.660 kg. of 3 N hydrochloric acid added thereto; adjusting the amount of liquid to 10 kg., and heating it to 85° C. under stirring, whereby the pH of the reaction liquid is 11.6 with about 2.5 millimoles of free calcium ions per 1 g. of protein;

the steps of gradually adding said protein solution over about 10 minutes to the reaction liquid under vigorous stirring, and thereafter, stirring it for about 10 minutes, whereby the pH is maintained at 11.6, subsequently adding 400 g. of 3 N hydrochloric acid and, after stirring for about 30 minutes, and adjusting the pH to 6.8 by further adding 3 N hydrochloric acid, filtering the resulting protein coagulate; and washing it. The reaction is tasteless, whereby the protein coagulate obtained has a meat-like texture similar to that of corned beef, with the following amount, composition and yield of product:

| | | |
|---|---|---|
| Fat | percent | 0.42 |
| Protein | do | 26.90 |
| Ash | do | 3.48 |
| Water content | do | 70.10 |
| Product | kg | 3.60 |
| Yield | percent | 96.9 |

16. A process for preparing a foodstuff material having a meat-like texture, as claimed in claim 1, comprising:

the step of preparing said protein solution at the ratio of 1.19 kg. of lactocasein dispersed in about 8 kg. of hot water at 40 to 50° C., and 0.715 kg. of 10%, by weight, with solution of $K_3PO_4$ added thereto, adjusting the amounts of liquid to 10 kg., heating it under stirring to completely dissolve the casein and then up to 75° C., adding 0.5 kg. of adjusted lard heated 75° C., melted, and stirred to dissolve, to the said protein solution, mixing, homogenizing at 75° C., 150 kg./cm.$^2$, and, thereafter, heating to 85° C., the pH of the resulting emulsion being 6.40 with 4.75% fat and 9.5% protein; the amount of liquid about 10.5 kg., dispersing 100 g. of calcium hydroxide and 370 g. of calcium chloride ($CaCl_2 \cdot 2H_2O$) in about 4 kg. of water, and, after adjusting the amount of liquid to 10 kg., heating it to 85° C. to form a reaction liquid, whereby the pH of the reaction liquid 11.6 and contains about 2.5 millimoles of free calcium ions per 1 g. of protein, adding the emulsion gradually, over about 10 minutes, to the reaction liquid under vigorous stirring, thereafter combining stirring for about 10 minutes and maintaining the pH at 11.6, adding 400 g. of 3 N hydrochloric acid thereto, and after stirring for 30 minutes, adjusting the pH to 6.8 by adding 3 N hydrochloric acid, after the neutralization was completed, filtering the portein coagulate produced, washing it and reducing the water content to about 65%, whereby the protein coagulate has a meat-like texture similar to that of corned beef, the amounts, composition and yield of the product being as follows:

| | | |
|---|---|---|
| Fat | percent | 10.02 |
| Protein | do | 20.05 |
| Ash | do | 3.20 |
| Water content | do | 66.73 |
| Product | kg | 4.90 |
| Yield | percent | 98.5 |

17. A process for preparing a foodstuff material having a meat-like texture, as claimed in claim 1, comprising:

the step of preparing said protein solution at a ratio of about 1.19 kg. of lactocasein consisting of 2.5% fat, 84.0% protein, 1.5% ash and 12.0% water dispersed in about 8 kg. of hot water at 40 to 50° C.; with about 0.715 kg. 10% by weight of $K_3PO_4$ solution added thereto; and, after adjusting the amount of liquid to 1 kg.; heating it under stirring to completely dissolve the casein and thereafter up to 90° C., whereby the pH of the casein solution is 6.4 and the protein concentration 10%, by weight;

the step of preparing the reaction liquid at a ratio of about 0.285 kg. of calcium hydroxide dispersed in about 3 kg. of water, and 1.660 kg. of 3 N hydrochloric acid added thereto; adjusting the amount of liquid to 10 kg., and heating it to 85° C. under stirring, whereby the pH of the reaction liquid is 11.6 with about 2.5 millimole of free calcium ion per 1 g. of protein;

further comprising the steps of adding the reaction liquid gradually, over about 10 minutes to the casein solution under vigorous stirring, stirring continuing for 10 minutes to complete the reaction until the pH is 11.6, adjusting the pH to 6.80 with 3 N hydrochloric acid, washing and reducing the water content to about 70%, whereby the consistency and structure of the protein coagulate resembles that of ground and boiled animal meat, and the amounts, yield, and composition of the product are as follows:

| | | |
|---|---|---|
| Fat | percent | 0.41 |
| Protein | do | 26.88 |
| Ash | do | 3.49 |
| Water | do | 70.22 |
| Product | kg | 3.57 |
| Yield | percent | 96.0 |

18. A process for preparing a foodstuff material having a meat-like texture, as claimed in claim 1, comprising:

the step of preparing said protein solution at the ratio of 1.19 kg. of lactocasein dispersed in about 8 kg. of hot water at 40 to 50° C., and 0.715 kg. of 10%, by weight, with solution of $K_3PO_4$ added thereto, adjusting the amounts of liquid to 10 kg., heating it under stirring to completely dissolve the casein and then up to 75° C., adding 0.5 kg. of adjusted lard heated 75° C., melted, and stirred to dissolve, to the said protein solution, mixing, homogenizing at 75° C., 150 kg./cm.$^2$, and, thereafter, heating to 85° C., the pH of the resulting emulsion being 6.40 with 4.75% fat and 9.5% protein; the amount of liquid about 10.5 kg., dispersing 100 g. of calcium hydroxide and 370 g. of calcium chloride ($CaCl_2 \cdot 2H_2O$) in about 4 kg. of water, and, after adjusting the amount of liquid to 10 kg., heating it to 85° C. to form a reaction liquid, whereby the pH of the reaction liquid 11.6 and contains about 2.5 millimoles of free calcium ions per 1 g. of protein, adding the emulsion gradually, over about 10 minutes, to the reaction liquid under vigorous stirring, thereafter combining stirring for about 10 minutes and maintaining the pH at 11.6, adding 400 g. of 3 N hydrochloric acid thereto, and after stirring for 30 minutes, adjusting the pH to 6.8 by adding 3 N hydrochloric acid, after the neutralization was completed, washing the protein coagulate produced, and reducing the water content to about 65%, whereby the protein coagulate has a ground and boiled meat-like texture, the amounts, composition and yield of the product being as follows:

| Fat | percent | 10.03 |
|---|---|---|
| Protein | do | 20.04 |
| Ash | do | 3.17 |
| Water content | do | 66.76 |
| Product | kg | 4.86 |
| Yield | percent | 97.8 |

19. A process for preparing a foodstuff material having a meat-like texture, as claimed in claim 1, comprising:

the step of preparing said protein solution at the ratio of 1.19 kg. of lactocasein and fat in proportions of 1:0.5:0.2 respectively, dispersed in about 8 kg. of hot water at 40 to 50° C., and 0.715 kg. of 10%, by weight, adding 0.2 kg. of corn starch dissolved in 10.5 kg. of the emulsion, with solution of $K_3PO_4$ added thereto, adjusting the amounts of liquid to 10 kg., heating it under stirring to completely dissolve the casein and then up to 75° C., adding 0.5 kg. of adjusted lard heated to 75° C., melted, and stirred to dissolve, to the said protein solution, mixing, homogenizing at 75° C., 150 kg./cm.², and, thereafter, heating to 85° C., the pH of the resulting emulsion being 6.40 with 4.75% fat and 9.5% protein; the amount of liquid about 10.5 kg., dispersing 100 g. of calcium hydroxide and 370 g. of calcium chloride ($CaCl_2 \cdot 2H_2O$) in about 4 kg. of water, and, after adjusting the amount of liquid to 10 kg., heating it to 85° C. to form a reaction liquid, whereby the pH of the reaction liquid is 11.6 and contains about 2.5 millimole of free calcium ions per 1 g. of protein, adding the emulsion gradually, over about 10 minutes, to the reaction liquid under vigorous stirring, thereafter combining stirring for about 10 minutes and maintaining the pH at 11.6, adding 400 g. of 3 N hydrochloric acid thereto, and after stirring for 30 minutes, adjusting the pH to 6.8 by adding 3 N hydrochloric acid, after the neutralization was completed, filtering the protein coagulate produced, washing it and reducing the water content to about 65%, whereby the protein coagulate has a texture similar to that of corned beef, the amounts, composition and yield of the product being of the following ratio:

| Fat | percent | 9.60 |
|---|---|---|
| Protein | do | 19.40 |
| Carbohydrate | do | 3.45 |
| Ash | do | 3.15 |
| Water | do | 64.40 |
| Product | kg | 5.03 |
| Yield | percent | 94.6 |

20. A process for preparing a foodstuff material having a meat-like texture, as claimed in claim 1, comprising the steps of:

preparing a soybean solution by dispersing 200 g. of soybean protein powder in hot water, and, after adjusting the pH to 10.5 with 10% (by weight) $K_3PO_4$ solution, heating it to dissolve with the amount of liquid adjusted to 2.0 kg.;

preparing a casein solution at the ratio of 1.19 kg. of lactocasein dispersed in about 8 kg. of hot water at 40 to 50° C., and 0.715 kg. of 10%, by weight, mixing said soybean solution with said casein solution and adjusting the temperature to 60° C.;

adding a solution of $K_3PO_4$ thereto;

adjusting the amounts of liquid to 10 kg., heating it under stirring to completely dissolve the contents and then up to 75° C., adding 0.5 kg. of adjusted lard heated to 75° C., melted, and stirred to dissolve, to the said protein solution, mixing, homogenizing at 75° C., 150 kg./cm.², and, thereafter, heating to 85° C., the pH of the resulting emulsion being 6.40 with 4.75% fat and 9.5% protein; the amount of liquid about 10.5 kg., dispersing 100 g. of calcium hydroxide and 370 g. of calcium chloride $(CaCl_2 \cdot 2H_2O)$ in about 4 kg. of water, and, after adjusting the amount of liquid to 10 kg., heating it to 85° C. to form a reaction liquid, whereby the pH of the reaction liquid is 11.6 and contains about 2.5 millimole of free calcium ions per 1 g. of protein, adding the emulsion gradually, over about 10 minutes, to the reaction liquid under vigorous stirring, thereafter combining stirring for about 10 minutes and maintaining the pH at 11.6, adding 400 g. of 3 N hydrochloric acid thereto, and after stirring for 30 minutes, adjusting the pH to 6.8 by adding 3 N hydrochloric acid, after the neutralization was completed, whereby a protein coagulate of meat-like texture is obtained, the amounts, composition and yield being of the following ratio:

| Fat | percent | 0.34 |
|---|---|---|
| Protein | do | 25.80 |
| Carbohydrate | do | 1.15 |
| Ash | do | 3.21 |
| Water | do | 69.50 |
| Product | kg | 3.50 |
| Yield | percent | 94.2 |

21. A process for preparing a foodstuff material having a meat-like texture, as claimed in claim 1, comprising:

the step of preparing said protein solution at a ratio of about 1.19 kg. of lactocasein dispersed in about 8 kg. of hot water at 40 to 50° C.; with about 0.23 kg. of 10% by weight of NaOH solution added thereto; and, after adjusting the amount of liquid to 10 kg.; heating it under stirring to completely dissolve the casein and thereafter to 90° C., whereby the pH of the casein solution is 6.35 and the protein concentration 10%, by weight;

the step of preparing the reaction liquid at a ratio of about 0.285 kg. of calcium hydroxide dispersed in about 3 kg. of water, and 1.660 kg. of 3 N hydrochloric acid added thereto; adjusting the amount of liquid to 10 kg., and heating it to 85° C. under stirring, whereby the pH of the reaction liquid is 11.6 with about 2.5 millimole of free calcium ions per 1 g. of protein;

the steps of gradually adding said protein solution over about 10 minutes to the reaction liquid under vigorous stirring, and thereafter, stirring it for about 10 minutes, whereby the pH is maintained at 11.6, subsequently adding 400 g. of 3 N hydrochloric acid and, after stirring for about 30 minutes, and adjusting the pH to 6.8 by further adding 3 N hydrochloric acid, filtering the resulting protein coagulate; and washing it, whereby the protein coagulate resembles boiled ground meat with the following amount, composition and yield of product:

| Protein | percent | 26.75 |
|---|---|---|
| Ash | do | 3.06 |
| Water | do | 69.78 |
| Product | kg | 3.57 |
| Yield | percent | 95.5 |

22. A process for preparing a foodstuff material having a meat-like texture, as claimed in claim 1, further comprising the step of curing meat at 4–5° C. for 3 days;

adding 25% table salt to the said protein coagulate and storing it cold for 1 day;

chopping the meat and the protein coagulate at a ratio of about 10.4 kg:4.0.2 kg., while adding 3.60 kg. of ice, coloring matter, spices, condiments, and preservatives (phosphates), thereto and lastly adding 3.58 kg. of lard thereto at 4–6° C. for about 9 minutes;

stuffing the product into a sausage casing, heating it smoked to make a sausage, whereby the sausage so obtained has no separation of fat and water, and its elasticity, firmness, and flavor are good.

23. A process for preparing a foodstuff material having a meat-like texture, as claimed in claim 1, further comprising the step of dehydrating the coagulated protein.

24. A process for preparing a foodstuff material having a meat-like texture as claimed in claim 1, further comprising the step of extending the mix during the step of reacting.

References Cited

UNITED STATES PATENTS

| 2,813,794 | 11/1957 | Anson et al. | 99—14 X |
|---|---|---|---|
| 3,093,483 | 6/1963 | Ishler et al. | 99—14 X |
| 3,491,080 | 1/1970 | Ehrensvärd et al. | 260—112 |

A. LOUIS MONACELL, Primary Examiner

W. A. SIMONS, Assistant Examiner

U.S. Cl. X.R.

99—14; 260—112, 123.5